(12) United States Patent
Seery et al.

(10) Patent No.: US 9,496,820 B2
(45) Date of Patent: Nov. 15, 2016

(54) PHOTOVOLTAIC MOUNTING SYSTEM AND DEVICES

(71) Applicant: SolarCity Corporation, San Mateo, CA (US)

(72) Inventors: Martin Seery, San Rafael, CA (US); Brian Atchley, San Rafael, CA (US); Garret Bautista, San Rafael, CA (US); Charles Almy, Berkeley, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/007,154

(22) Filed: Jan. 26, 2016

(65) Prior Publication Data
US 2016/0248368 A1 Aug. 25, 2016

Related U.S. Application Data

(60) Provisional application No. 62/120,841, filed on Feb. 25, 2015, provisional application No. 62/260,178, filed on Nov. 25, 2015.

(51) Int. Cl.
*H02S 20/23* (2014.01)

(52) U.S. Cl.
CPC ..................... *H02S 20/23* (2014.12)

(58) Field of Classification Search
CPC ......... H02S 20/10; H02S 20/23; F16J 15/14; F16J 2/5245; F16J 2/5258; F16J 2002/5294; F16J 2002/5296; F16J 2/52; F24J 2/5256; F24J 2/5249; F24J 2/52; F16B 13/04; F16B 21/073; F16B 43/00
USPC ......... 52/704, 173.3, 698; 405/259.1, 259.3; 411/23, 386, 413, 82, 452, 258, 371.1
See application file for complete search history.

(56) References Cited

U.S. PATENT DOCUMENTS 2,092,341 A * 9/1937 De Vries ............... F16B 13/143
248/231.91
2,666,354 A 6/1950 Dim et al.
(Continued)

FOREIGN PATENT DOCUMENTS

CN 202796998 U 3/2013
EP 0 276 708 A1 8/1988
(Continued)

OTHER PUBLICATIONS

"S-5! The Right Way" CorruBracket Brochure, Metal Roof Innovations, Ltd., Colorado Springs, CO, 2010, 2 pages, retrieved from the internet on Jan. 26, 2016 from http://www.sunsourceproducts.com/catalog/productdetail.asp?cat=07&part=S5-COR.
(Continued)

*Primary Examiner* — Beth Stephan
(74) *Attorney, Agent, or Firm* — Kilpatrick Townsend & Stockton LLP

(57) ABSTRACT

Photovoltaic mounting systems having sealant injection system are provided herein. Such sealant injection systems provide directional control and containment of sealant flow providing improved sealing of roof penetrations of a mounted roof anchor. Such systems can include an anchor having a base and mechanical fastener and a sealant injection package, which includes a collapsible sealant injection reservoir and is adapted to provide directionally controlled release and containment of sealant upon tightening of the mechanical fastener into the roof surface. Such systems can include a sealant carrier that fits into an underside cavity of the anchor base and isolates the sealant injection package from anchoring load paths. The carrier can also define a flow path and sealant area in an underside recessed portion defining a cavity between the carrier and roof surface to provide a more uniform consistent sealant flow to form a chemical flashing about any roof penetration.

20 Claims, 6 Drawing Sheets

(56) References Cited

U.S. PATENT DOCUMENTS

| | | | |
|---|---|---|---|
| 3,504,498 A | 4/1970 | Triplett | |
| 3,940,941 A | 3/1976 | Libert et al. | |
| 4,372,708 A | 2/1983 | Bower, Jr. et al. | |
| 4,425,065 A * | 1/1984 | Sweeney | F16B 13/143 156/92 |
| 4,472,088 A | 9/1984 | Martin | |
| 4,531,861 A | 7/1985 | Kash | |
| 4,555,206 A * | 11/1985 | Sweeney | F16B 13/143 405/259.6 |
| 4,693,652 A * | 9/1987 | Sweeney | F16B 19/00 405/259.6 |
| 4,830,558 A * | 5/1989 | Sweeney | F16B 47/003 248/205.3 |
| 4,896,416 A | 1/1990 | Cranko et al. | |
| 5,281,065 A | 1/1994 | Wu | |
| 5,315,800 A | 5/1994 | Weber et al. | |
| 5,873,201 A | 2/1999 | Fey | |
| 5,937,603 A | 8/1999 | Zeidler | |
| 6,017,176 A * | 1/2000 | Marui | F16B 37/048 411/258 |
| 6,035,595 A | 3/2000 | Anderson | |
| 6,536,729 B1 | 3/2003 | Haddock | |
| 7,963,726 B2 | 6/2011 | Boot | |
| 8,011,868 B2 * | 9/2011 | Stephan | E04F 13/0853 411/542 |
| 8,151,522 B2 | 4/2012 | Stearns et al. | |
| 8,557,081 B2 | 10/2013 | Sha et al. | |
| 8,733,718 B2 | 5/2014 | Corsi | |
| 8,756,871 B1 * | 6/2014 | Johnson | E02D 31/02 52/2.14 |
| 8,756,881 B2 | 6/2014 | West et al. | |
| 8,875,453 B2 | 11/2014 | Kanczuzewski et al. | |
| 8,920,088 B1 | 12/2014 | Garvin | |
| 8,931,989 B2 | 1/2015 | Stephan | |
| 2007/0272234 A1 | 11/2007 | Allen et al. | |
| 2011/0067693 A1 * | 3/2011 | Paull | F24J 2/5203 126/704 |
| 2012/0186630 A1 | 7/2012 | Jenkins et al. | |
| 2013/0020455 A1 | 1/2013 | Sizelove et al. | |
| 2013/0133270 A1 | 5/2013 | West et al. | |
| 2013/0167455 A1 | 7/2013 | Jenkins et al. | |
| 2013/0291479 A1 | 11/2013 | Schaefer et al. | |
| 2013/0299655 A1 * | 11/2013 | Sader | F24J 2/5205 248/231.9 |
| 2014/0060625 A1 | 3/2014 | Beuke et al. | |
| 2014/0130847 A1 | 5/2014 | West et al. | |
| 2014/0130957 A1 | 5/2014 | Verdier et al. | |
| 2014/0175244 A1 | 6/2014 | West et al. | |
| 2014/0196769 A1 | 7/2014 | Schoop et al. | |
| 2015/0107185 A1 | 4/2015 | Kose et al. | |
| 2015/0218824 A1 | 8/2015 | Schaefer et al. | |
| 2015/0280639 A1 | 10/2015 | Atchley et al. | |
| 2016/0142006 A1 | 5/2016 | Meine et al. | |

FOREIGN PATENT DOCUMENTS

| | | |
|---|---|---|
| EP | 2348263 A3 | 12/2014 |
| GB | 442832 A | 2/1936 |
| JP | 2008274591 A | 11/2008 |
| JP | 2 454 368 A | 5/2009 |
| JP | 2014 088733 A | 5/2014 |
| WO | 2008/156578 A1 | 12/2008 |

OTHER PUBLICATIONS

International Search Report mailed on Jun. 10, 2016, for International Patent Application No. PCT/US2016/019630, 7 pages.
Written Opinion mailed on Jun. 10, 2016, for International Patent Application No. PCT/US2016/019630, 6 pages.

* cited by examiner

PHOTOVOLTAIC MOUNTING SYSTEM AND DEVICES

CROSS REFERENCE TO RELATED APPLICATIONS

This claims the benefit of priority of U.S. Provisional Patent Application No. 62/120,841 filed on Feb. 25, 2015, and U.S. Provisional Patent Application No. 62/260,178 filed on Nov. 25, 2015; each of which is incorporated herein by reference in its entirety.

This is also related to U.S. patent application Ser. No. 14/949,820, filed Nov. 23, 2015, the disclosure of which is incorporated herein by reference in its entirety for all purposes.

FIELD OF THE INVENTION

The invention relates to photovoltaic energy generation mounting systems and more specifically to systems, devices and methods for installing photovoltaic modules on composition shingle roofs.

BACKGROUND

Although total market penetration of solar into the relevant base of potential customers remains relatively low in the United States (e.g. less than about one percent), residential and commercial solar installs have enjoyed double digit growth since the mid to late 2000s. Despite this recent success, developments to reduce cost, increase efficiency and improve overall home integration are ongoing and must continue to increase solar's relatively meager market share when compared to fossil fuel-based grid power.

One problem that remains to be solved is an economic and effective solution to improve sealing of roof surface penetrations to prevent water from leaking into the roof structure. Whether photovoltaic modules are attached to rails, or proprietary rail-free mounting systems, the modules must be securely attached to the roof, which typically involves using a flashing combined with a lag bolt and seal. A pilot hole is typically drilled where the rafter is thought to lie, and if so, is followed by a larger drill hole to accommodate the lag bolt. The flashing is then positioned so that the lag through-hole and seal are positioned over the pre-drilled hole. Typically, a puck or other structure is then placed on the flashing and a lag bolt is then passed through the puck, through the through-hole in the flashing and into the pre-drilled hole. The lag bolt is then torqued down to secure the puck to the roof so that the photovoltaic modules can then be mounted to the puck and flashing.

Although flashings cover up a lot of space, potentially covering mis-drilled or off-center pilot holes, flashings are relatively expensive because they require more metal than direct mounted solutions. Also, in order to set the flashing at the proper location, partially under the up-roof course of shingles, it is often necessary to remove existing nails holding down those shingles. Each time a nail is removed, another potential leak point is created.

Some installers have utilized direct mount or deck mounted solutions which abandon the flashing in favor of a flat bottomed mounting bracket or foot that is screwed or lagged directly into the roof deck. In cases where the lag is driven through a roof rafter, a single lag bolt may used. In other cases, where the foot is simply screwed into the plywood that comprises the roof deck regardless of rafter location, three or more lag bolts may be used to achieve the requisite strength. In either case, the holes made in the roof by the lag bolts must be sealed to prevent water from leaking in around the threads of the lag and/or to fill any nearby miss-drilled pilot holes.

To deal with this problem, installers have used caulk or other sealant, typically dispensed from a separate tube or caulk gun to fill these holes as the installation proceeds. This can be messy for the installer, requires a separate large and bulky tool (e.g., caulk gun), and requires another product SKU to be stocked in the truck's inventory. Moreover, there is no way to ensure that the installer remembers, or even he does remember, that he actually applies caulk or sealant to the lag holes. Therefore, there exists a need for photovoltaic mounting systems that provide reliable and controlled sealing of any penetrations of the roof while minimizing mess and installer mishaps.

BRIEF SUMMARY

In a first aspect, anchors adapted for anchoring in a planar surface and that include a sealant injection system are provided herein. Such anchors can include an anchor base with a through-hole for passage of a mechanical fastener therethrough and a support surface for supporting a collapsible sealant reservoir spaced above the surface when mounted thereon. The support surface further includes an aperture for directing flow of sealant therethrough to where the mechanical fastener penetrates the planar surface upon collapse of the reservoir by securing of the mechanical fastener. Such anchors can further include a recessed portion that defines a cavity between the support surface and the planar surface into which the flowable sealant flows upon collapse of the reservoir. The recessed portion can be dimensioned so as to surround where the fastener penetrates to provide improved sealing of the penetration and/or to form a more uniform layer of cured sealant of at least a minimum thickness to improve sealing and/or form a chemical flashing.

In another aspect, mounting systems are provided that include an anchor with a sealant injection package. Such system can include an anchor including a base having a first array facing side and a second, opposing roof-facing side. The base includes a through-hole extending between the first and second sides for passage of a mechanical fastener, such as a lag bolt, through the base into the roof surface. The second roof-facing side can include a roof contacting surface extending about a perimeter of the second side. The mechanical fastener is adapted to penetrate a roof surface and engage the first side of the base so as to anchor the base when the mechanical fastener is torqued into the roof surface. The sealant injection package can be disposed within the base or can include one or more portions of the base or components that interface with the base. Typically, the sealant injection package includes a collapsible sealant reservoir, such as a foil packet, that contains a flowable sealant. The sealant injection package includes a support surface that is adapted to support the sealant reservoir spaced apart from the roof surface when the roof contacting surface contacts the roof. The support surface includes an aperture through which the flowable sealant extrudes when the reservoir is collapsed to direct the flowable sealant toward a roof penetration through which the mechanical fastener extends. The support surface can be a portion of the base or can be a portion of a sealant carrier adapted to carry the collapsible sealant reservoir. The anchor can further includes a recessed portion that defines an underside cavity between the support surface and the roof surface surrounding the mechanical fastener that contains the extruded flowable sealant about the roof penetration through which the mechanical fastener extends and forms a chemical flashing thereon.

In various embodiments, such mounting systems having sealant injection systems further include a compressing plate disposed above the sealant injection package. The compressing plate can include a hole that aligned with the through-hole of the base so that tightening of the mechanical fastener during mounting compresses the plate against the sealant injection package. Typically, the hole in compressing plate is smaller than the aperture in the support surface so that flowable sealant is directed primarily, if not entirely, through the aperture in the support surface. In some embodiments, the aperture in the support surface is substantially larger than the mechanical fastener, such as by between 10 to 300%. Typically, the hole in the compressing plate is only marginally larger width-wise than the mechanical fastener, such as by less than 25%, to inhibit passage of flowable sealant therethrough.

In various embodiments, such mounting systems having sealant injection systems include a compressing plate that is fittingly receivable in a receptacle in the first side of the base. Alternatively, the compressing plate can be disposed within an underside cavity of the base. The compressing plate includes a planar compressing surface disposed above the collapsible sealant reservoir with a hole for passage of the mechanical fastener therethrough. Such a compressing plate can further include an upwardly protruding collar surrounding the hole that extends above the top opening of the through-hole in the first side of the base for engagement with the mechanical fastener.

In various embodiments, the anchor base includes one or more support coupling features on the first side of the base for interfacing with a corresponding coupling feature of a support foot for supporting a photovoltaic module or an associated component. Such support coupling features can be holes or any feature suitable for coupling with a support adapted for supporting a photovoltaic module. The anchor base can include multiple coupling features in differing positions along the first side to allow differing configurations of a support foot as needed to extend an associated connector to a desired location on the photovoltaic module. In various embodiments, the anchor base includes at least two rows of support coupling features on opposite sides of the top opening of the through-hole to allow a range of differing configurations of the support foot.

In various embodiments, the collapsible sealant reservoir comprises a frangible packet filled with the flowable sealant. Such a packet can be formed of a foil or polymer that can be easily torn or punctured by insertion of the lag bolt therethrough, but is sufficiently strong and sealable to contain the flowable sealant within during shipping. Typically, the flowable sealant is sealed within the packet and is adapted to cure when exposed to air and/or moisture upon release from the packet.

In various embodiments, such mounting system having a sealant injection package can include a carrier defining the support surface on which the collapsible sealant reservoir is supported. The carrier can be dimensioned to be received within an underside cavity of the base and can include an aperture in the support surface that is aligned with the through-hole of the base. The carrier can includes one or more retaining features, such as hooks, clips, tethers, or any suitable feature for retaining the carrier within the base. The carrier can further include an underside recessed portion that defines a cavity between the support surface and the roof surface in which the chemical flashing is formed. The system can further include a compressible gasket that circumscribes underside recessed portion of the carrier so as to fill any spaces between mating surfaces and contain any excess sealant within.

In various embodiments, such mounting systems can include an anchor base having a top surface with a recessed shoulder circumscribing the top opening of the through-hole. Such a configuration can provide a load path applied through a head of the mechanical fastener during tightening that extends through the base via the shoulder so as to reduce or eliminate loads applied to the carrier. Such embodiments can utilize a carrier formed of a plastic or thermoresin, while the anchor base is typically formed of a more rigid, higher strength material, such as a cast metal (e.g. aluminum or steel alloy).

In another aspect, photovoltaic mounting systems for mounting on a roof surface can include an anchor having a through-hole for passage of a mechanical fastener and a sealant injection package. The anchor can include a base defined as a metal shell having an open underside cavity circumscribed by a roof contacting surface. The sealant injection package can be disposed within the open underside cavity and include a collapsible sealant reservoir containing a flowable sealant. The package can further include a compressing plate disposed atop the collapsible sealant reservoir and a carrier adapted to support the collapsible sealant reservoir spaced away from the roof surface. The carrier can further include a recessed portion that defines a cavity between the carrier and the roof surface that surrounds the mechanical faster into which the flowable sealant is extruded through an aperture in the carrier. The recessed portion can be dimensioned so as to provide a more uniform, layer of sealant of at least a minimum thickness, such as a thickness between 2 mm to 20 mm, so as to form a chemical flashing about the sealed penetration of the fastener.

In various embodiments, such mounting systems can include an anchor base having one or more pairs of alignment markers viewable by a user during mounting. The alignment markers correspond to outer bounds of the recessed cavity of the carrier so as to allow the user to visualize the eventual location of the chemical flashing formed within the cavity. Such a configuration allows positioning of the base over any secondary roof penetrations adjacent to the roof penetration through which the mechanical fastener extends.

In yet another aspect, such mounting system having sealant injection packages can include an anchor base that is substantially rectangular in shape and include a main portion and a stepped-up portion along an up-roof side of the rectangular base that engages a first shingle course while the main portion engages a second down-roof adjacent shingle course. The anchor base can further include a recessed shoulder portion defined about a top opening of the through-hole so as to be engageable with a head of the mechanical fastener or an associated component. The base can further include an upwardly open groove extending down-roof from the recessed shoulder portion and one or more weep holes or notches in a down-roof side of the rectangular base shell for drainage of any accumulated water. In various embodiments, such a rectangular anchor base can include outwardly curved portions along lateral sides of the main portion so as to contain any excess flowable sealant extruding beyond the cavity defined by the recessed portion of the carrier.

DETAILED DESCRIPTION OF THE INVENTION

The present invention seeks to ameliorate some if not all of the shortcomings of the prior art with a photovoltaic mounting system that includes a sealant reservoir and injector mechanism that provides improved direction control of sealant injection as well as improved control over containment of injected sealant around a lag hole of a lag bolt torqued down to attach the photovoltaic mounting hardware to the roof. In various embodiments, the lag bolt may can engage a compressing plate or other structure that compresses a package containing sealant thereby forcing sealant to flow between the mounting hardware and the roof surface as the lag bolt is torqued down. In various embodiments, the photovoltaic mounting system may come pre-loaded with sealant injection package system so that the installer can guarantee that sealant is applied to every lag bolt, regardless of whether the installer intentionally does so. In other embodiments, the sealant reservoir is separable from the mounting bracket so that the sealant reservoir can be replaced as needed or assembled according to differing specifications before shipment of the mounting system to the user.

The attached Figures illustrate several injector systems useable with specific photovoltaic mounting systems, however, these illustrated embodiments are exemplary only. It should be appreciated that the broader concept of an integrated lag bolt sealant injector that controls injection of sealant during mounting of a fastener can take many different forms beyond those shown here and may be usable with many different roof-top photovoltaic mounting systems without departing from the spirit or scope of the invention.

Referring now to FIGS. 1A-7C, these figures all illustrate various views of particular example embodiments of lag bolt sealant injector systems combined with various embodiments of a roof mounted anchor in a photovoltaic mounting system. It is appreciated, however that these concepts are applicable to any anchor mounted to a planar surface where improved sealing of a mechanical fastener penetration is desired.

Figure 1A:
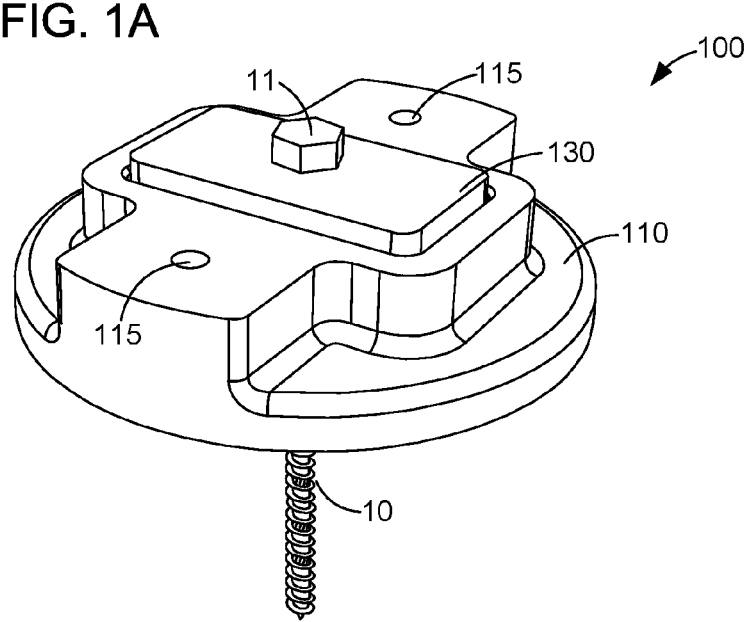
FIGS. 1A-1B are perspective views of a top side and an underside of an anchor system having a sealant injection package, in accordance with various embodiments.
Figure 1B:
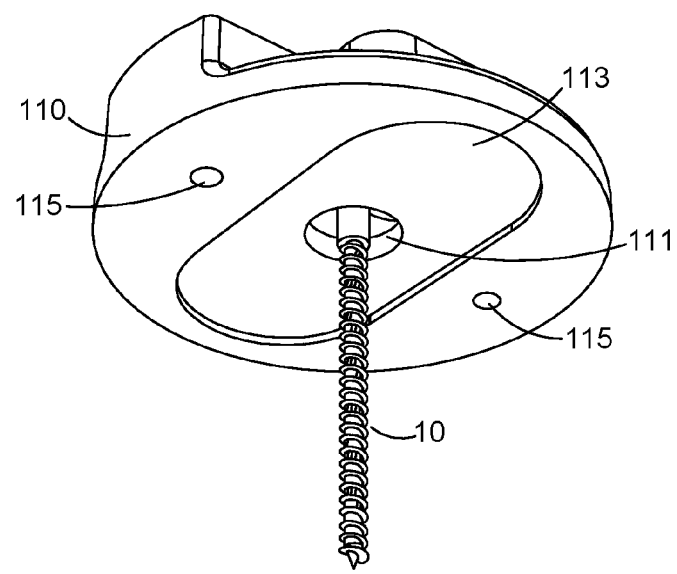

FIGS. 1A-1B depict anchor system 100 for use in a mounting system securing a photovoltaic module to a roof surface. FIG. 1A depicts a first array facing side of anchor system 100, which includes anchor base 110 having through-hole 111 for insertion of a mechanical fastener, such as lag bolt 10, and having a pair of support coupling features 115 on a top surface of base 110 that securely couple with a corresponding coupling feature of a support foot (not shown) for supporting a photovoltaic module or associated component (e.g. rock-it style connector). In this embodiment, support coupling features 115 are defined as holes that securely couple with corresponding holes in a support foot by use of another mechanical fastener (e.g. threaded bolt). While support coupling features 115 are depicted throughout as holes, it is appreciate that such features could encompass any coupling feature suitable for securing a support foot or arm to anchor base 110.

Anchor base 110 can be formed as an integral component, for example a cast-metal piece formed of steel or an aluminum alloy, so as to better withstand the anchoring loads and cyclical stresses applied to the anchor over the lifetime of the photovoltaic system. The sealant injection package includes a collapsible sealant reservoir positioned beneath a compressing plate 130 so that upon tightening of lag bolt 10, fastener head 11 pressingly engages compressing plate 130 thereby collapsing sealant reservoir and extruding a flowable sealant contained within throughhole 111 beneath sealant reservoir, as can be seen in the underside view of anchor system 110 shown in FIG. 1B. Hole 111 is dimensioned with sufficient clearance around lag bolt 10 (e.g. 5-20 mm) so that the flowable sealant extrudes around the lag bolt. To provide additional control over the flow of sealant, the underside of anchor base 110 includes a recessed portion 113 that defines a relatively thin cavity that extends a distance around the lag hole formed by lag bolt 10. In some embodiments, recessed cavity extends at least 50 mm in each direction around hole 111 to ensure sufficient sealing of lag hole as well as any adjacent secondary holes, such as failed test pilot holes. In one aspect, recessed area 113 provides a continuous void of at least a pre-defined thickness (e.g. 1 mm or greater, typically about 2-8 mm) so that the flowable seal, upon curing, forms a chemical flashing. In some aspects, the chemical flashing is a substantially planar flashing member defined by a cured sealant that is formed as an integral component.

Figure 2:
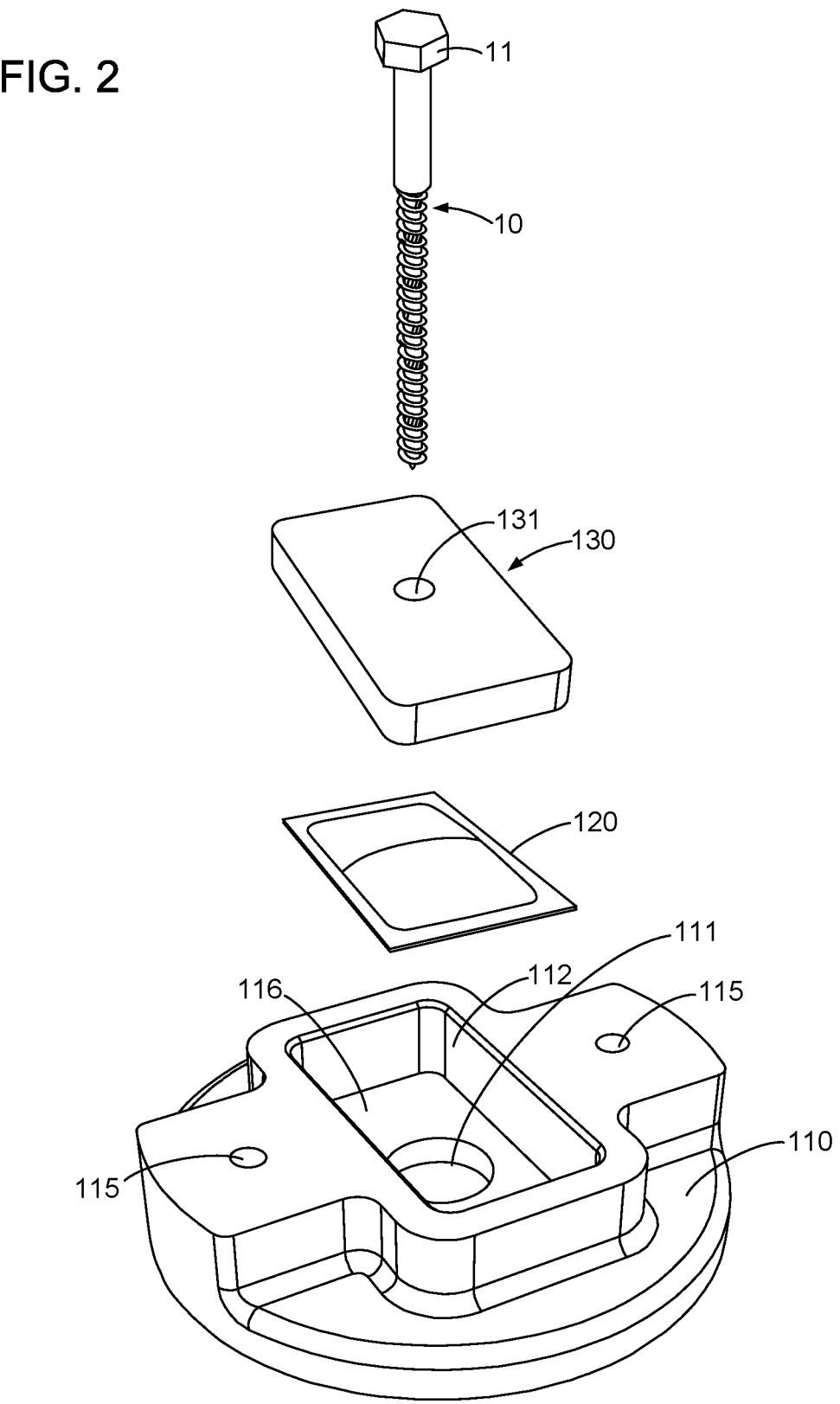
FIG. 2 is an exploded view of the anchor system shown in FIG. 1A, in accordance with various embodiments.

FIG. 2 shows an exploded view of anchor system 100 of FIG. 1A. In this view, it can be seen that collapsible sealant reservoir 120 is contained within a sealant receptacle 112 accessed through a first array facing side of anchor base 110 and rests on a support surface 116 above the aperture of through hole 111. Compressing plate 130 fits atop collapsible sealant reservoir 120 within receptacle 112 and includes a central hole 131 that aligns with aperture 111. Lag bolt 10 can be inserted through hole 131 and through collapsible reservoir 120 and aperture of through-hole 111 and into the lag hole in the roof surface. Typically, collapsible sealant reservoir 120 is a collapsible, frangible packet (e.g. foil or polymer pouch) filled with a flowable sealant that cures when exposed to air and/or moisture upon release form the packet. In this embodiment, insertion of lag bolt 10 through the anchor assembly punctures the packet, while lag bolt head 11 presses against compressing plate 130, thereby collapsing reservoir 120 and forcing flowable sealant through the larger aperture of through-hole 111. When the bottom surface of anchor base 110 is placed flat against the roof surface, the sealant flows into the cavity defined by the recessed portion 113 and surrounds the lag bolt about the penetration. In this embodiment, the cavity defines a planar void extending a distance about the lag bolt such that when filled with flowable sealant and cured, a chemical flashing is formed. In this embodiment, the chemical flashing formed is entirely contained under anchor base 110 such that the flashing is protected from the elements. In addition, since the sealant is substantially contained within the cavity defined by the recessed portion, the load applied by lag bolt 10 is transferred through the bottom surface (e.g. non-recessed portion) such that the chemical flashing is not exposed to significant strains or stresses during the lifetime of the anchor.

Figure 3:
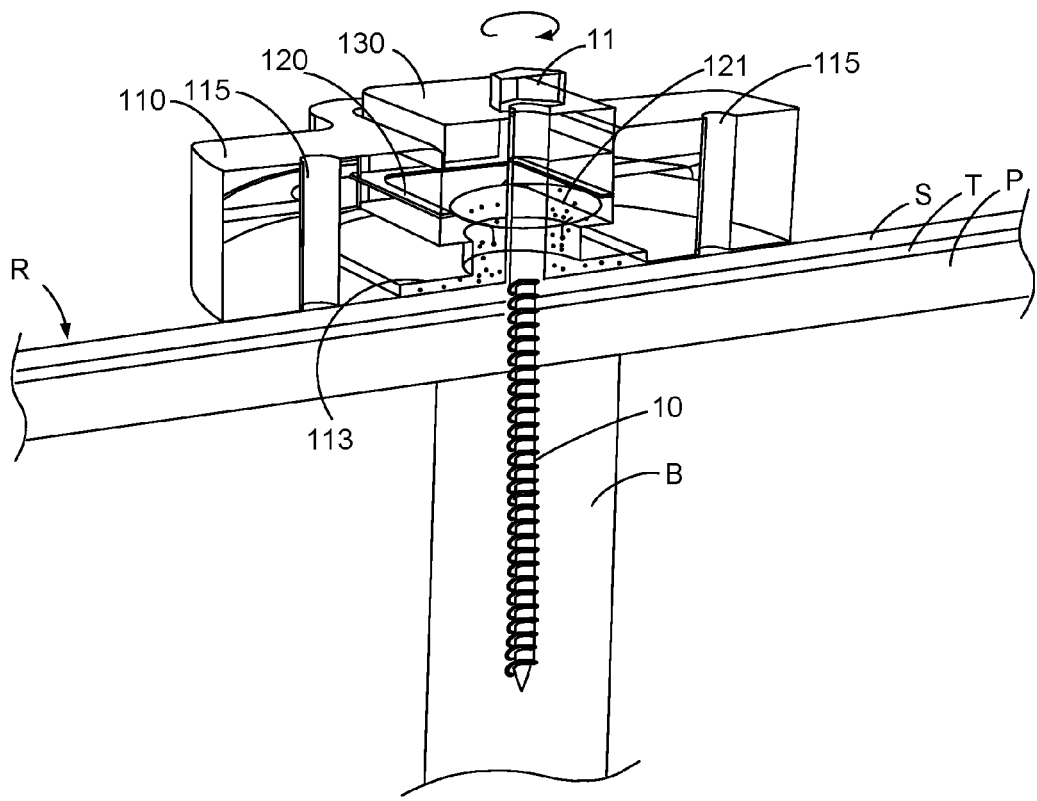
FIG. 3 is a cross-sectional view of the anchor system in FIG. 1A during mounting on a roof surface, in accordance with various embodiments.

FIG. 3 shows the anchor system 100 of FIGS. 1A-1B after being mounted to roof R by tightening lag bolt 10, which extends through anchor system 100 and penetrates through shingle S, underlying tar paper T and plywood P and into the rafter or beam B supporting roof R. As can be seen, when anchor base 110 is engaged against shingle S, recessed portion 113 forms a thin cavity extending about the lag bolt adjacent the lag hole. While in this embodiment, through-hole 111 defines the aperture through which sealant flows, it is appreciated that an additional member, such as a sealant carrier, could be inserted into the receptacle beneath collapsible reservoir 120 so as to define an aperture of a different size than through-hole 111, if needed. As shown, as lag bolt 10 is tightened, head 11 presses against compressing plate 130 thereby collapsing the punctured reservoir 120 thereby releasing flowable sealant and forcing flow of sealant through aperture and into the cavity. Tightening of lag bolt 10 continues until compressing plate 130 bottoms out on support surface 116 with the spent, collapsed reservoir 120 sealed in between.

Figure 4:
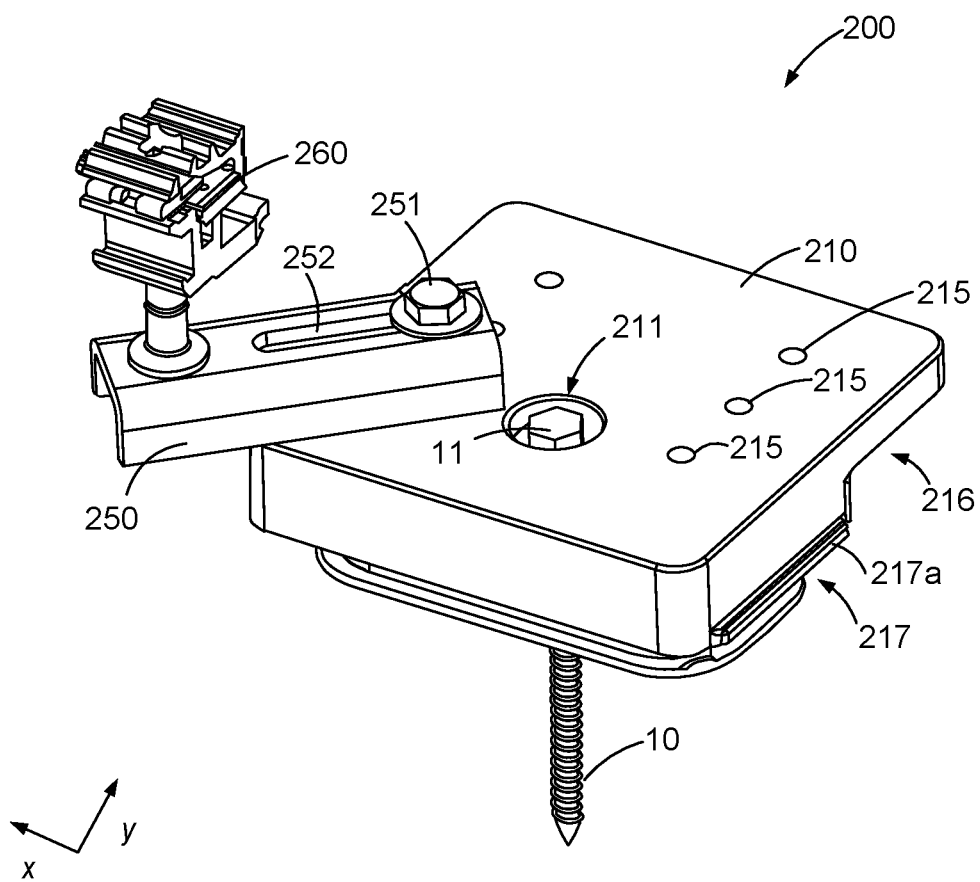
FIG. 4 is a perspective view of a mounting system having an anchor with a sealant injection package, in accordance with various embodiments.

FIG. 4 illustrates exemplary mounting system 200, which includes an anchor system having a sealant injection package and a support foot 250 having a rock-it style connector 260 for securely attaching to a photovoltaic module. In this embodiment, anchor base 210 is formed as a shell with an open cavity, which is positioned against the roof surface when mounted thereon. Base 210 is formed in a generally rectangular shape having a planar top surface with multiple support coupling features 215 to which support foot 250 can be securely coupled to in various differing positions. In this embodiment, support coupling features 215 are holes that couple with a corresponding hole or slot 252 in foot 250 by use of another mechanical fastener (e.g. bolt, washer). Slot 252 allows the position of foot 250 to be adjusted along its longitudinal axis before securely coupling to the coupling feature 215. As shown, the multiple support coupling features 215 include two rows of three holes extending lengthwise on a top surface of anchor base 210 on opposite sides of the through-hole 211. Such a configuration is advantageous as the location of a rafter or beam in a roof to which anchor 200 can be coupled often does not correspond to a desired position of a foot for supporting the photovoltaic module, particularly since a support connector, such as rock-it connector 260 can only couple to the photovoltaic module at certain locations on the module. By including multiple support coupling features 215 in a top surface of anchor base 210, preferably distributed along two transverse axes (e.g. x and y), the above-described configuration allows for a wide range of differing positions and alignments in which support foot 250 can be secured to the roof via anchor system 200.

In various embodiments, the down-roof most support coupling feature 215 is spaced a suitable distance away from the down-roof edge of the top surface so that a substantial portion (e.g. about half or more) of support foot 250 engages the top surface of base 210. This configuration ensures a significant portion of the support foot engages the base 210 so as to limit the length of the cantilevered load path and prevent the foot from prying anchor 210 off the roof. In some embodiments, system 200 is provided with support foot 250 that is shorter than standard (e.g. less than 80 mm, about 66 mm or less) so as to ensure that a substantial portion of support foot 250 is engaged against a top planar surface of anchor base 210 regardless of which support coupling feature the foot is attached to. Typically, the support foot is secured to anchor base 210 with the foot extending in a generally downward direction, as shown.

In another aspect, anchor base 210 includes an outer perimeter circumscribing the open cavity that engages the roof surface. As shown in FIG. 4, the outer perimeter includes a main portion 217 that engages a shingle course outside of the chemical flashing formed about the lag hole and a stepped-up portion 216 that engages an adjacent shingle course up-roof of the lag hole. Stepped-up portion 216 is dimensioned so as to accommodate a height differential of the up-roof adjacent shingle course. This height differential can vary based on the type and style of shingles, but typically is within a range of between 5 mm to 30 mm. One advantage of such a configuration is that stepped-up portion 216 allows for a ready frame of reference for the installer to position and align anchor base on the roof. In addition, configuring anchor base 210 to straddle the adjacent shingle course can ensure that the bottom down-roof edge of anchor base 210 is spaced away from a drip edge of the shingle course so as to avoid water and debris from entering the cavity from down-roof. The outer perimeter can further include a ridge or lip 217a that further enhances engagement of the perimeter edge of anchor base 210 with roof surface so as to further improve sealing as well as containment of the extruded flowable sealant within the cavity. As shown, ridge or lip 217a is included only on the perimeter of the main portion that extends along the y-direction, although it is appreciated that such a ridge or lip could extend along up-roof portion 216 or about the entire perimeter. Such a lip or ridge could be included on the perimeter of any of the embodiments described herein.

In this embodiment, the sealant injection package is disposed within the open cavity of anchor base 210. As can be seen in the exploded view shown in FIG. 5, the sealant injection package includes collapsible sealant reservoir 220, a compressing plate 230 disposed above the reservoir 220 and a sealant carrier 240 adapted to carry the collapsible sealant reservoir 220. Typically, the sealant reservoir 220 is separable from and removable from the carrier, but in various embodiments, system 200 is provided to an end-user as a package with the reservoir 220 disposed within the carrier. Carrier 240 includes sealant support surface 242 on which sealant reservoir 220 is placed, which includes aperture 241 through which sealant is extruded when sealant reservoir 220 is collapsed. Carrier 240 can include sidewalls 245 so as to define a receptacle for carrying sealant reservoir 220 and receiving compressing plate 230 atop sealant reservoir 220.

In various embodiments, the various components of the anchor system can be releasably coupled together with one or more releasable retaining feature so as to maintain the assembly during transit to an end-user. For example, in the embodiment shown in FIG. 4B, carrier 240 can further include one or more retaining features 244, such as flexible clips, cords, tabs or tethers, that releasably engage corresponding features within the underside cavity of anchor base 210 so as to loosely and removably couple carrier 240 with anchor base 210 so that, in combination, anchor base 210 and carrier 230 retain compressing plate 230. Any of the sealant reservoirs carriers described herein can include one or more such retaining features for maintaining the components of the system in an partially or fully assembled configuration.

It if further appreciated that any of the embodiments described herein can include one or more retaining features adapted to couple two or more components of the system together so that the anchor system can be shipped or provided to a user in a partially or fully assembled configuration. Such components can include but are not limited to the sealant reservoir, carrier, compressing plate, anchor base and mechanical fastener. Such retaining features can include various interfacing features, such as tabs, protrusions, or tethers that interface with corresponding recess, slots or holes, or any interfacing features suitable for coupling two components together. In various embodiments, such retaining features are adapted to loosely and releasably couple components together so that the end-user can readily remove one or more components (e.g. lag bolt, carrier) to facilitate mounting of the anchor system to the roof. In some embodiments, the retaining features are adapted such that retraction of one component releases the coupling. For example, the system in FIG. 5 can be provided with lag bolt 10 extending through the through-hole 211 of base 210 through opening 231 in compressing plate 231, adjacent an intact sealant package 220 and through aperture 241 of carrier 240 loosely clipped within base 210 with a distal end of bolt 10 loosely coupled with a distal retaining feature (e.g. clip or tether) attached to an underside of base 210. In such a configuration, detachment of the distal end of lag bolt 10 from the distal retaining feature readily releases all or a portion of the various components of the assembly. Such a configuration is advantageous as each anchor assembly can be transported and readily handled by a user stationed on a roof surface without having to separately handle and possibly lose various components. When ready for mounting, the assembly can readily be partly or fully disassembled to facilitate mounting on the roof.

Figure 5:
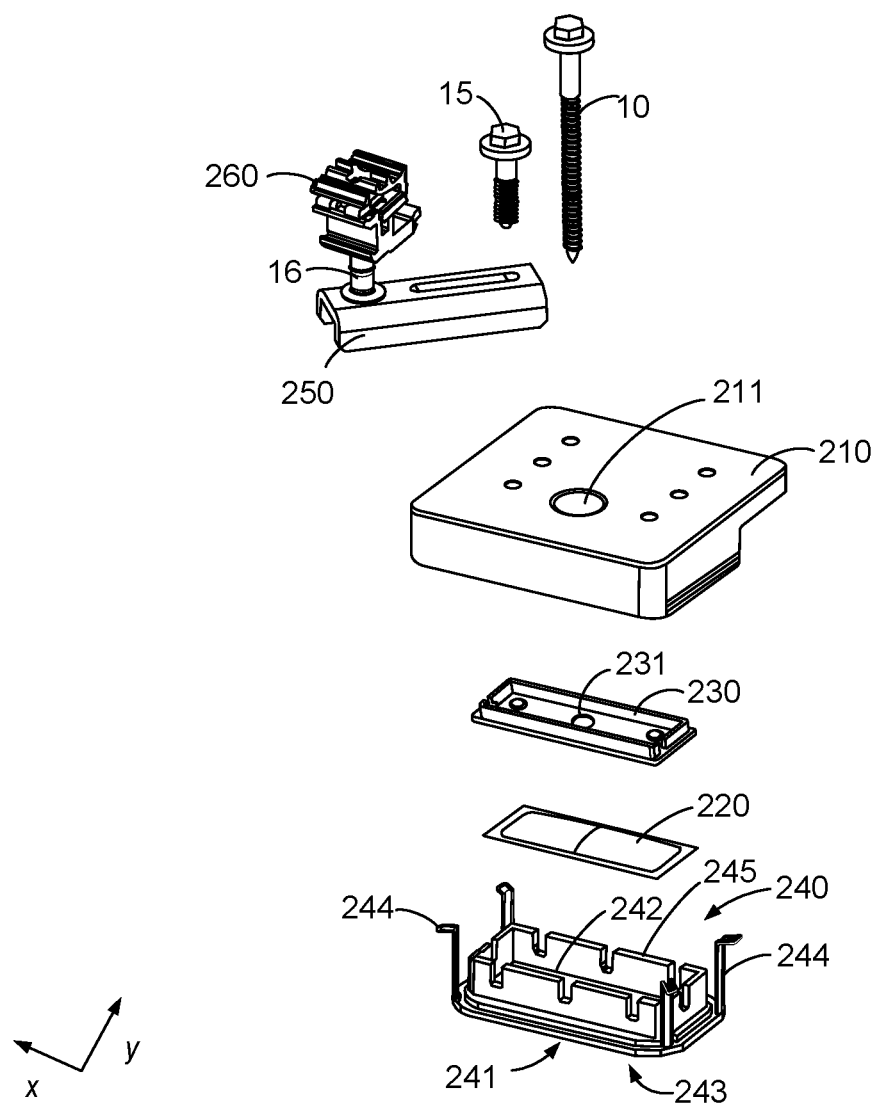
FIG. 5 is an exploded view of the mounting system shown in FIG. 4, in accordance with various embodiments.
Figure 6:
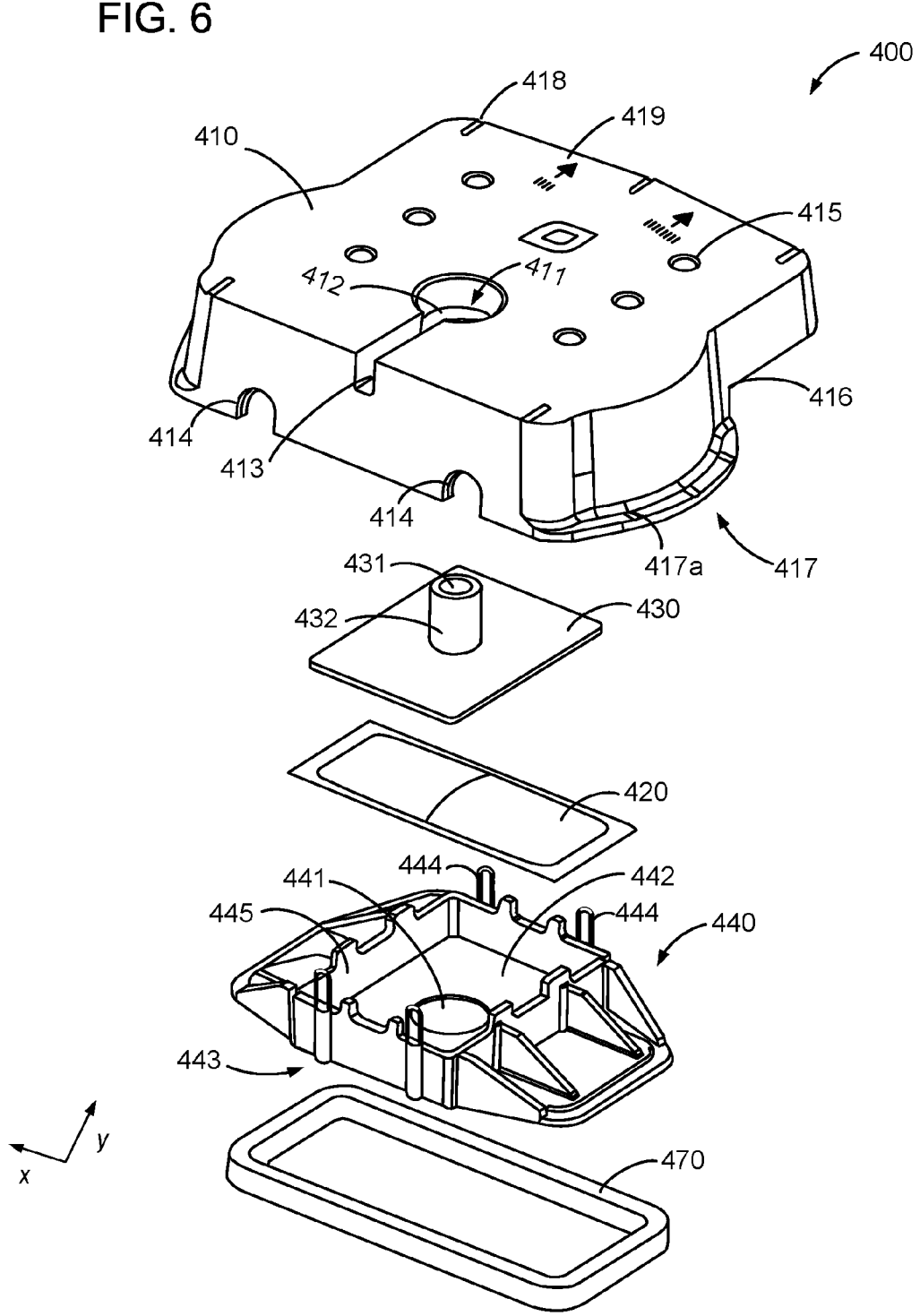
FIG. 6 is a perspective view of yet another anchor system having a sealant injection package, in accordance with various embodiments.

FIG. 6 illustrates an exploded view of another example embodiment somewhat similar to that in FIGS. 4-5 apart from modification of certain aspects of various components. It is appreciated that any of these or similar modifications could be included on various components in any of the embodiments described herein.

In one aspect, the embodiment shown in FIG. 6 is an anchor system 400 that includes anchor base 410 having a generally rectangular shape similar to that in FIG. 5, but the lateral sides of main portion 417 are outwardly curved. This configuration provides an enlarged cavity that extends laterally further outside of the cavity defined by recessed portion 443 of carrier 440 (recessed portion 443 being similar to recessed portion 113 in FIG. 1B). Such a configuration may help contain any excess sealant flow that extends beyond the cavity about lag bolt at the lag hole. In addition, lip or ridge 417a is included on outwardly curved sides of main portion 417 so as to further enhance engagement with the roof surface, as described previously.

In another aspect, the embodiment in FIG. 6 further includes compressing plate 430 with hole 431 for passage of the lag bolt. Compressing plate 430 further includes upwardly protruding collar 432 that extends a distance upwards so as to extend above a top opening of through-hole 411 atop anchor base 410. Such a configuration allows the lag bolt head or an associated washer to engage the top surface of collar 432 so as to pressingly engage compressing plate 430 downwards to extrude the flowable sealant from the collapsible sealant reservoir 420 punctured by the lag bolt extending therethrough. Lag bolt head continues to press the top surface of collar downward and then engages recessed shoulder 412 circumscribing the top opening of through-hole 411 to secure anchor base 410 to the roof surface. Upon engaging recessed shoulder 412, the load applied by the fastener head is transferred largely to anchor base 410, which avoids exerting the load through carrier 440. Such a configuration allows carrier 440 to be formed of a less durable material, such as a molded polymer or thermoresin, while anchor base 410 is typically formed of a higher strength, rigid material, such as a metal casting (e.g. aluminum or steel alloy). In such embodiments, having recessed shoulder region 412 or counterbore about the mechanical fastener head, anchor base 410 can further include a drainage grove 413 extending down-roof from recessed portion 412 to the second side of anchor base 410 to allow drainage of any residual water accumulating in recessed portion 412. Anchor base 410 can further include one or more weep holes or notches 414 along the down-roof side of base 410 to allow drainage of any water that accumulates within the cavity. It is appreciated that the above described drainage groove and weep holes or notches can be included on any of the above described embodiments and in various other such embodiments.

In this embodiment, carrier 440 includes an enlarged aperture 441 in sealant supporting surface 442, recessed underside portion 443, and four retaining tabs 444 that engage corresponding features within an underside cavity of anchor body 410. Carrier 440 further includes sidewalls 445 that define a receptacle for carrying sealant reservoir 420 during transport and handling.

In yet another aspect, anchor system 400 further includes compressible gasket 470 that is dimensioned to fit just outside the recessed portion 443 on an underside of carrier 440. Gasket 470 is formed of a compressible material, such as a foam or elastomeric material, so as to seal any openings or gaps between mating surfaces surrounding the recessed portion. Such openings are typically due to uneven or irregular shingle surfaces or the drip edge between two adjacent course of shingles. By sealing any opening or gaps, gasket 470 further improves containment of the flowable sealant with the cavity defined by recessed portion so as to define a more consistent and uniform chemical flashing of cured sealant.

In yet still another aspect, anchor base includes alignment markers 418 outwardly visible to a user during installation of the anchor on the roof surface. Alignment markers 418 correspond to a location of outer bounds of the recessed portion 443 defining the cavity between carrier 440 and the roof surface so as to enable the user to visualize the area in which the chemical flashing is formed. This is particularly advantageous for sealing of one or more unused pilot holes that may have been formed adjacent the lag hole when initially attempting to locate the rafter or beam supporting the roof surface. Typically, alignment markers 417 includes pairs of alignment markers 418 indicating the outer bounds of the recessed area along one or more axes. In some embodiments, anchor base can include an outline on the top surface that corresponds to the recessed portion to further allow for ready visualization of the location in which the chemical flashing will be formed. By observing the position of markers 418 or the outline, an installer can manually position anchor base 410 so as to cover any adjacent pilot holes before proceeding with installation. If any pilot holes are disposed outside of the perimeter indicated by the markers, the installer must manually seal or fill the holes.

The embodiments of the present inventions should not be limited in scope by the embodiments described herein. Indeed, various modifications of the embodiments of the present inventions, in addition to those described herein, will be apparent to those of ordinary skill in the art from the foregoing description and accompanying drawings and claims. Thus, such modifications are intended to fall within the scope of this invention. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, this disclosure should be construed in view of the full breath and spirit of the embodiments disclosed herein and claimed below.

What is claimed is:

1. A photovoltaic mounting system for mounting on a roof surface, the system comprising:
    an anchor including a base having a first array facing side and a second, opposite roof-facing side and a through-hole extending between the first and second sides, wherein the second side includes a roof contacting surface extending about a perimeter thereof;
    a mechanical fastener adapted to penetrate a roof surface and extend through the through-hole while engaging the first side of the base so as to anchor the base when the mechanical fastener is torqued into the roof surface; and
    a sealant injection package disposed within the base and comprising a collapsible sealant reservoir containing a flowable sealant therein,
    wherein the anchor includes a support surface that is adapted to support the sealant injection package spaced apart from the roof surface when the roof contacting surface contacts the roof surface when mounted thereon and that includes an aperture through which the flowable sealant extrudes when the reservoir is collapsed so as to direct the flowable sealant toward a roof penetration through which the mechanical fastener extends,
    wherein the anchor defines a cavity between the support surface and the roof surface, when mounted thereon, that surrounds the mechanical fastener so as to direct the extruded flowable sealant about the roof penetration through which the mechanical fastener extends.

2. The photovoltaic mounting system of claim 1, wherein the sealant injection package further includes:
    a compressing plate disposed above the sealant injection package and having a hole aligned with the through-hole of the base for passage of the mechanical fastener so that tightening of the mechanical fastener during mounting compresses the plate against the sealant injection package.

3. The photovoltaic mounting system of claim 2, wherein the hole in the compressing plate is smaller than the aperture in the support surface so that flowable sealant is directed through the aperture in the support surface.

4. The photovoltaic mounting system of claim 3, wherein the aperture in the support surface is larger than the mechanical fastener by between 10 to 300% and the hole in the compressing plate is larger width-wise than the mechanical fastener by less than 25%.

5. The photovoltaic mounting system of claim 2, wherein the compressing plate comprises a plate fittingly receivable in a receptacle in the first side of the base or that is disposed within the cavity of the base.

6. The photovoltaic mounting system of claim 5, wherein the compressing plate is disposed within the cavity of the base and comprises a planar compressing surface disposed above the collapsible sealant reservoir and an upwardly protruding collar surrounding the hole that extends above an opening of the through-hole in the first side of the base for engagement with the mechanical fastener.

7. The photovoltaic mounting system of claim 1, wherein the base further includes one or more support coupling features on the first side of the base, each adapted for interfacing with a corresponding coupling feature of a support foot for supporting a photovoltaic module or an associated coupling component.

8. The photovoltaic mounting system of claim 7, wherein the one or more support coupling features includes a plurality of coupling features in differing positions along the first side to allow differing configurations of the support foot.

9. The photovoltaic mounting system of claim 8, wherein the plurality of support coupling features include at least two rows of support coupling features on opposite sides of the through-hole to allow a range of differing configurations of the support foot.

10. The photovoltaic mounting system of claim 1, wherein the collapsible sealant reservoir comprises a packet filled with the flowable sealant that can be punctured by passage of the mechanical fastener therethrough.

11. The photovoltaic mounting system of claim 10, wherein the sealant injection package further includes a carrier that defines the support surface on which the collapsible sealant reservoir is supported, the carrier being dimensioned to fit within the cavity of the base with the aperture in the support surface aligned with the through-hole of the base.

12. The photovoltaic mounting system of claim 11, wherein the carrier includes one or more retaining features for retaining the carrier within the base.

13. The photovoltaic mounting system of claim 11, wherein the sealant injection package further includes a compressible gasket that circumscribes the second side of the base so as to fill any spaces between mating surfaces and to contain the flowable sealant within the cavity.

14. The photovoltaic mounting system of claim 11, wherein the first side of the base includes a recessed shoulder circumscribing a top opening of the through-hole such that a load path applied by a head of the mechanical fastener during tightening extends to the roof surface through the anchor base via the shoulder so as to reduce any loads applied to the carrier.

15. A photovoltaic mounting system for mounting on a roof surface, the system comprising:
    an anchor including a base defined as a metal shell having a cavity that opens toward an underside of the base and that is circumscribed by a roof contacting surface, wherein the base includes a through-hole;
    a mechanical fastener adapted to penetrate a roof surface and extend through the through-hole of the base while engaging a top surface of the base to anchor the base to the roof when the mechanical fastener is fastened with the roof surface; and
    a sealant injection package disposed within the cavity of the base, wherein the sealant injection package comprises a:
        a collapsible sealant reservoir containing a flowable sealant therein,
        a compressing plate disposed atop the collapsible sealant reservoir, and
        a carrier having a support surface that supports the collapsible sealant reservoir spaced away from the roof surface and includes an aperture beneath the collapsible reservoir, wherein the carrier further includes a recessed portion on an underside thereof, that defines a cavity into which the flowable sealant is extruded through the aperture when the reservoir is collapsed, wherein the cavity surrounds the mechanical faster during mounting so as to seal a roof penetration associated with the mechanical fastener.

16. The photovoltaic mounting system of claim 15, wherein the base includes one or more pairs of alignment markers viewable by a user during mounting positioned so as to indicate outer bounds of the cavity defined by the recessed portion of the carrier so as to allow positioning of the base over any secondary roof penetrations adjacent the mechanical fastener.

17. The photovoltaic mounting system of claim 15,
wherein the base is substantially rectangular in shape and adapted with a main portion and a stepped-up portion along an up-roof side of the rectangular base so that the stepped-up portion engages a first shingle course while the main portion engages an adjacent down-roof shingle course,
wherein the base further includes a recessed shoulder portion defined about a top opening of the through-hole so as to be engageable with a head of the mechanical fastener or an associated component, wherein the base further includes an upwardly open groove extending down-roof from the recessed shoulder portion and one or more weep holes or notches in a down-roof side of the base for drainage.

18. The photovoltaic mounting system of claim 17, wherein the base includes outwardly curved portions along lateral sides of the main portion so as to contain any excess flowable sealant extruding beyond the cavity defined by the recessed portion.

19. A photovoltaic mounting system for mounting on a roof surface, the system comprising:
an anchor including a base having a first array facing side and a second, opposite roof-facing side and a through-hole extending between the first and second sides, wherein the second side includes a roof contacting surface extending about a perimeter thereof;
a lag bolt adapted to penetrate a roof surface and extend through the through-hole while engaging the first side of the base so as to anchor the base when the lag bolt is torqued into the roof surface;
a sealant injection package disposed within the base and comprising a collapsible sealant reservoir containing a flowable sealant therein; and
a support surface provided on the anchor or on the sealant injection package that is adapted to support the sealant injection package spaced apart from the roof surface when the roof contacting surface contacts the roof surface when mounted thereon and that includes an aperture through which the flowable sealant extrudes when the reservoir is collapsed so as to direct the flowable sealant toward a roof penetration through which the lag bolt extends,
wherein the anchor or the sealant injection package defines a cavity between the support surface and the roof surface, when mounted thereon, that surrounds the lag bolt so as to direct the extruded flowable sealant about the roof penetration through which the lag bolt extends.

20. The photovoltaic mounting system of claim 19, further comprising an underside recessed portion on the anchor or on a carrier of the sealant injection package that defines the cavity between the support surface and the roof surface.

* * * * *